US 6,575,495 B2

(12) United States Patent
Calder

(10) Patent No.: US 6,575,495 B2
(45) Date of Patent: Jun. 10, 2003

(54) AIRBAG MOUNTING MODULE

(75) Inventor: Mark A. Calder, Holland, MI (US)

(73) Assignee: Johnson Controls Technology Company, Plymouth, MI (US)

(*) Notice: Subject to any disclaimer, the term of this patent is extended or adjusted under 35 U.S.C. 154(b) by 0 days.

(21) Appl. No.: 09/916,097

(22) Filed: Jul. 26, 2001

(65) Prior Publication Data
US 2003/0020262 A1 Jan. 30, 2003

(51) Int. Cl.[7] .................................................. B60R 21/16
(52) U.S. Cl. ......................... 280/728.2; 280/728.1; 280/732
(58) Field of Search ......................... 280/728.2, 728.3, 280/732, 752, 728.1; 296/70

(56) References Cited

U.S. PATENT DOCUMENTS

| 5,135,252 A | * | 8/1992 | Suran et al. | 280/728.2 |
|---|---|---|---|---|
| 5,195,775 A | * | 3/1993 | Komerska et al. | 280/728.2 |
| 5,326,132 A | * | 7/1994 | Musiol et al. | 220/642 |
| 5,350,190 A | * | 9/1994 | Szigethy | 280/728.3 |
| 5,356,174 A | * | 10/1994 | Rhein et al. | 280/728.2 |
| 5,380,037 A | * | 1/1995 | Worrell et al. | 280/728.2 |
| 5,385,366 A | * | 1/1995 | Frank et al. | 280/728.3 |
| 5,433,471 A | * | 7/1995 | Shepherd et al. | 280/728.2 |
| 5,489,116 A | * | 2/1996 | Boag | 280/728.2 |
| 5,588,669 A | * | 12/1996 | Leonard et al. | 280/728.2 |
| 5,620,201 A | * | 4/1997 | Ricks | 280/728.2 |
| 5,641,178 A | * | 6/1997 | Lee | 280/728.3 |
| 5,658,009 A | * | 8/1997 | Saderholm | 280/728.2 |
| 5,669,626 A | * | 9/1997 | Bartos et al. | 280/728.2 |
| 5,687,989 A | * | 11/1997 | Maesing et al. | 280/728.2 |
| 6,056,313 A | * | 5/2000 | Lutz et al. | 280/728.1 |
| 6,068,286 A | * | 5/2000 | Heilig | 280/728.3 |
| 6,126,191 A | * | 10/2000 | Pepperine et al. | 280/728.2 |
| 6,325,415 B1 | * | 12/2001 | Zelinski et al. | 280/728.1 |

FOREIGN PATENT DOCUMENTS

JP         05185896 A    *  7/1993    ........... B60R/21/20

* cited by examiner

Primary Examiner—Brian L. Johnson
Assistant Examiner—Kelly E Campbell
(74) Attorney, Agent, or Firm—Price, Heneveld, Cooper, DeWitt & Litton

(57) ABSTRACT

A cradle receiving an airbag module is formed to slide within an instrument trim panel without the need for separate fasteners or installation steps. In a preferred embodiment, the cradle was formed of a rigid foam material and in a most preferred embodiment it was formed of expanded polypropylene to enclose the airbag module on all sides except the front activation surface of the airbag for deployment.

9 Claims, 3 Drawing Sheets

AIRBAG MOUNTING MODULE

BACKGROUND OF THE INVENTION

The present invention relates to a mounting system for a vehicle airbag module and particularly to an airbag module for mounting in the instrument panel or doors.

Instrument panel mounted airbags for use on the passenger side of a vehicle are typically secured to the instrument trim panel by means of metal or plastic brackets. Three brackets are usually required, one extending across the top of the airbag module and two PAB (passenger airbag brackets) below the airbag module. Thus, three brackets with multiple fasteners are employed. As a result, the installation of the airbag module in a vehicle is somewhat labor intensive. With the additional cost of the brackets and fasteners, such installations can be relatively expensive. Further, the brackets and fasteners add undesirable weight to the vehicle. With open spaced-apart brackets mounting the airbag module, upon impact and deployment of the airbag, the airbag may have a tendency to deploy somewhat into the instrument panel area as opposed to outwardly into the passenger space. As a result, the spaced bracket mounting system may not be ideal for the mounting of airbags in an instrument panel or in other areas of a vehicle, such as the doors for side impact airbags. Also, the mounting system must be designed to absorb head impacts in situations where the airbag is not deployed.

Accordingly, there exists a need for a less expensive, lighter weight airbag module mounting system which is less labor intensive for installation.

SUMMARY OF THE INVENTION

The mounting system of the present invention satisfies this need by providing a cradle surrounding the airbag module which is preformed to slide within an instrument panel interlocking the combined airbag module and cradle to the instrument panel without the need for separate fasteners or installation steps. In a preferred embodiment of the invention, the cradle was formed of a foam polymeric material and in a most preferred embodiment of the invention it was formed of expanded polypropylene to enclose the airbag module on all sides, thereby leaving only the front activation surface of the airbag exposed for deployment upon impact. In some embodiments of the invention, the airbag module can be integrated with the foam polymeric cradle and sold as a single unit to the OEM manufacture for installation in a vehicle. In all embodiments, the cradle is shaped to receive an airbag module in close contact surrounding five of the sides thereof and includes mounting structure which interengages the instrument trim panel to mount the cradle to the trim panel and receive the airbag module within the cradle. With such a system, therefore, the mounting of an airbag, for example, in an instrument panel or a door panel of a vehicle is facilitated, and the airbag module is substantially continuously enclosed on all sides except the operational front deployment side. The cradle is made of an energy absorbing foam polymeric material to also absorb head impacts in the event the airbag does not deploy. Such a structure thereby enhances the performance of the airbag module while reducing the cost of installation, the weight of the vehicle, and results in an overall reduction of cost of the vehicle.

These and other features, objects and advantages of the present invention will become apparent upon reading the following description thereof together with reference to the accompanying drawings.

DETAILED DESCRIPTION OF THE PREFERRED EMBODIMENT

Figure 1:
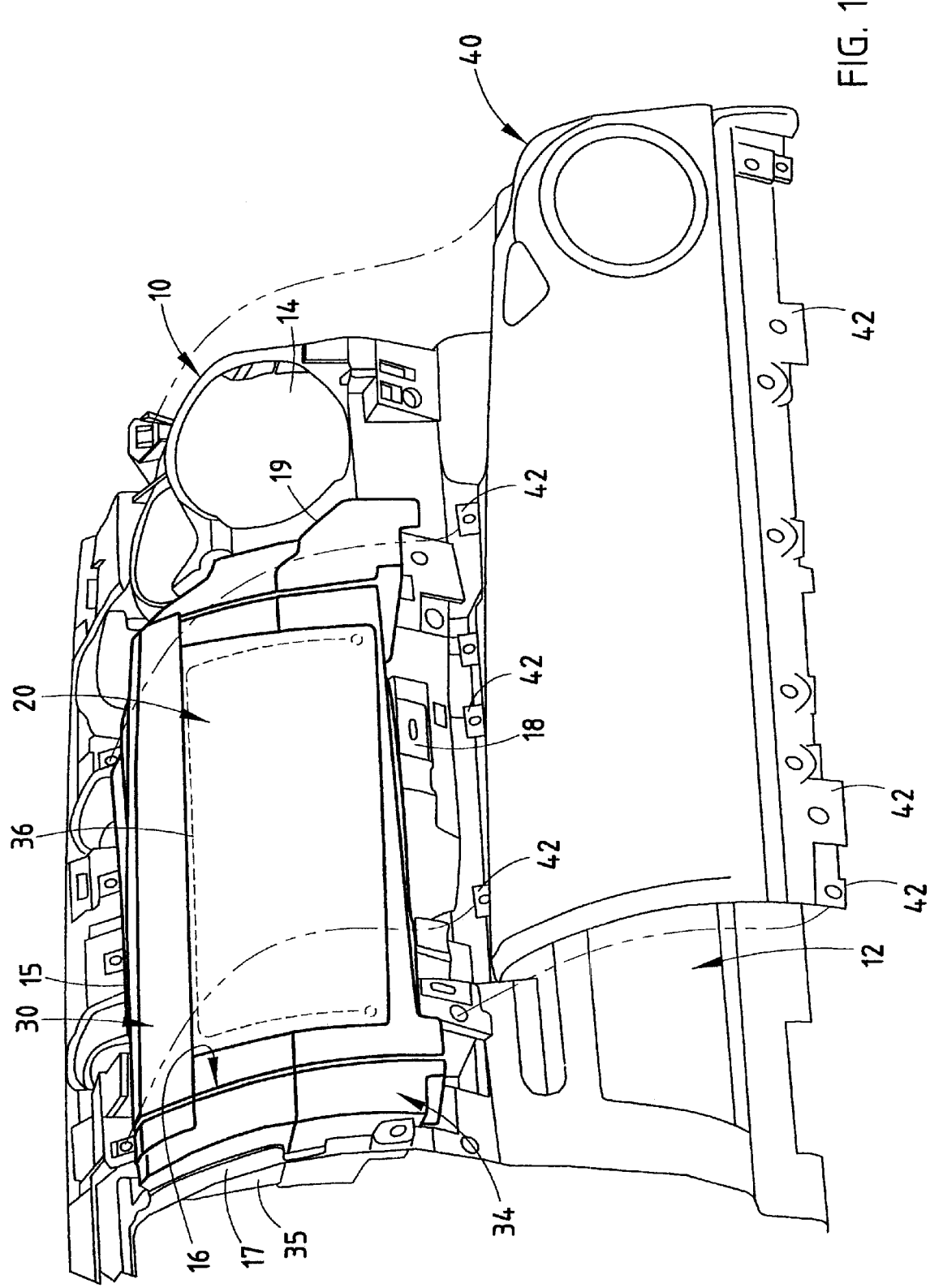
FIG. 1 is an exploded fragmentary perspective view of a vehicle instrument trim panel showing an airbag module and mounting cradle of the present invention.
Figure 3:
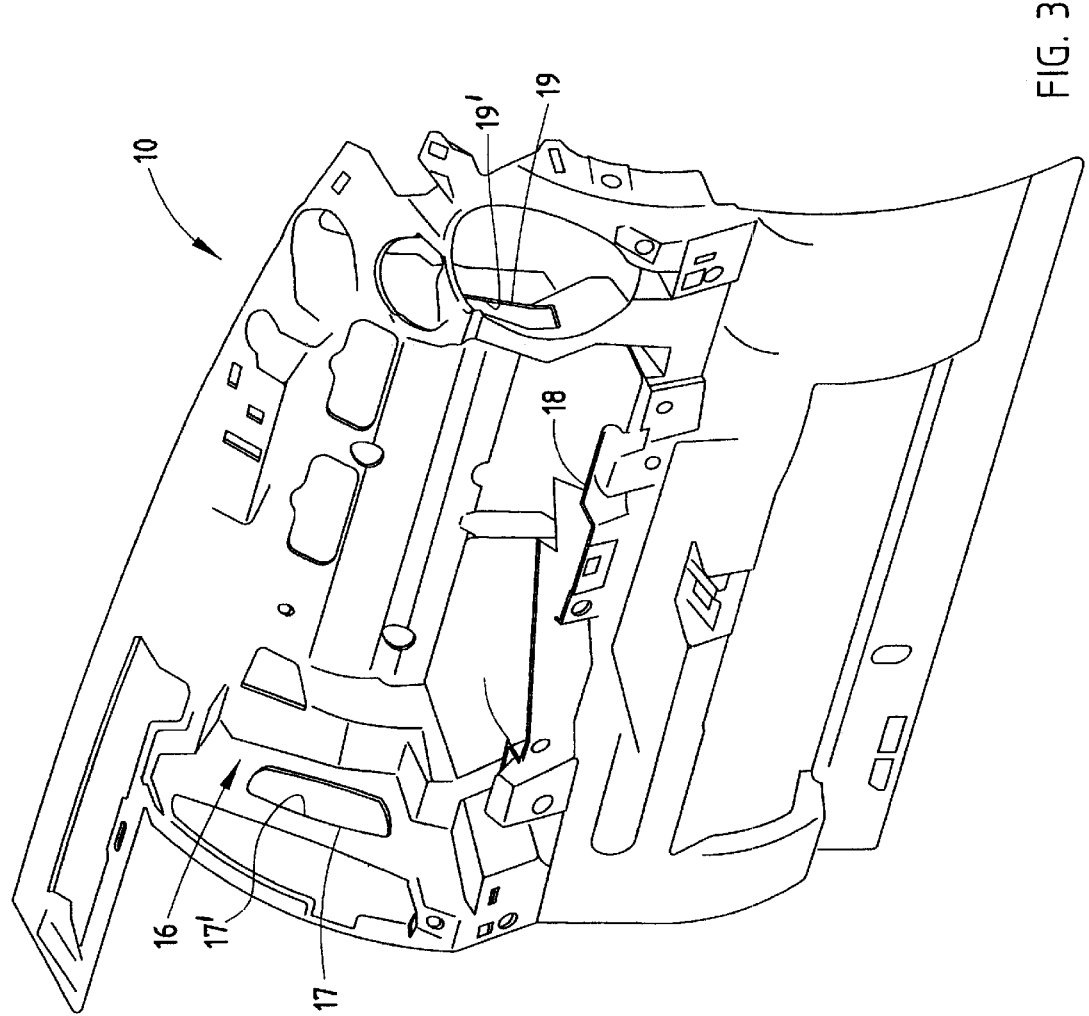
FIG. 3 is a fragmentary perspective view of the trim panel.

Referring initially to FIGS. 1 and 3, there is shown an instrument trim panel 10 for a vehicle. The right or passenger side of the trim panel 10 is shown, which is made of a suitable polymeric material such as polypropylene, polycarbonate, or other conventional polymeric materials employed for instrument trim panels. Trim panel 10 is mounted to the sheet metal firewall of the vehicle during manufacture of the vehicle and is configured to include openings such as opening 12 for a glove compartment and openings, such as 14, for HVAC ducts and outlets. In the upper section of the instrument trim panel 10 on the passenger side, there is a generally rectangular opening 16 for receiving a passenger side airbag module 20, which is a generally rectangular commercially available unit.

In the preferred embodiment of the invention, the opening 16 defines a socket for receiving a cradle 30 into which the airbag module 20 is mounted with the socket 16 including sidewalls 17 and 19 on opposite sides of the generally rectangular opening 16 (FIG. 3). The instrument trim panel 10 also integrally includes PAB door supports 18 for the cradle 30, thus supporting the cradle on opposite sides and the bottom. Cradle 30, with the nested airbag module as described below, is installed by sliding the structure into the socket 16 of instrument panel 10 during manufacture. Once installed, interlocking members 35, 36 of the cradle 30, as described below, engage slots 17' and 19' in flexible sidewalls 17 and 19 of the instrument trim panel 10, and the cradle 30 can be attached to panel 10 without the use of fasteners. A PAB door 40 of suitable material, such as vinyl, includes mounting tabs 42 at various spaced locations and encloses the passenger facing front side of the instrument trim panel 10 using suitable fasteners (not shown). The panel 40 includes a conventional breakaway area aligned with airbag module 20 to allow the airbag to deploy into the passenger compartment while holding the module 20 within cradle 30.

Figure 2:
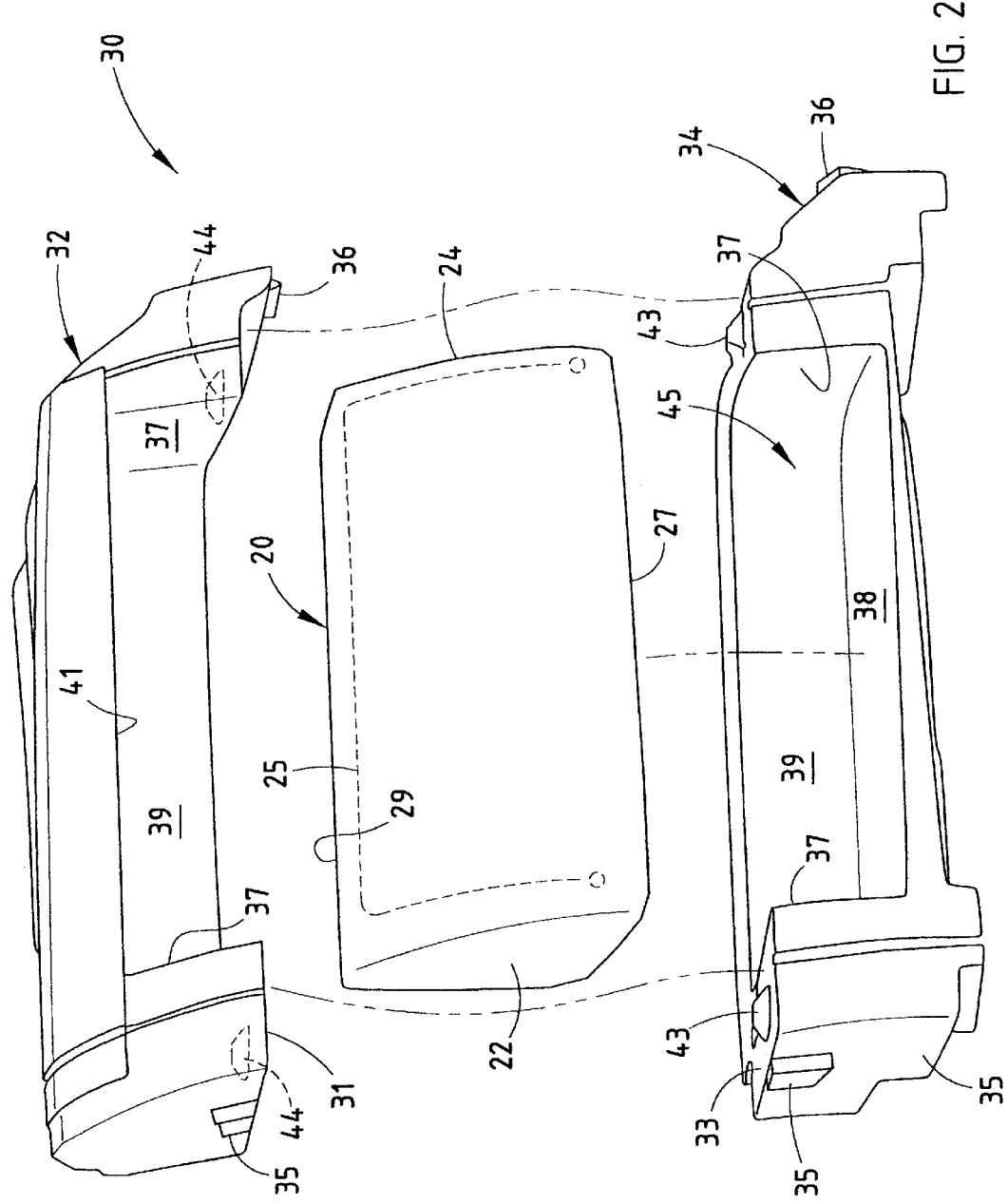
FIG. 2 is an exploded perspective view of the airbag module and mounting cradle of the present invention.

As seen in FIG. 2, the cradle 30 comprises, in one embodiment, an upper piece 32 and a lower piece 34 joined along opposed facing joining surfaces 31 and 33. The opposite edges of upper and lower cradle pieces or sections 32 and 34 include interlocking members 35 and 36 on opposite sides which are configured to snap-fit within the mounting socket 16 by deflecting sidewalls 17 and 19 (FIG. 3), compressing the foam cradle 30 to interlock cradle 30 within apertures 17' and 19' of socket 16. For any given vehicle, the exact configuration of socket 16 and cradle 30 will vary. As seen in FIG. 2, the left side of cradle 30 may be a generally longitudinal rectangular vertically extending member 35, while right side members 36 are shorter rectangular blocks extending horizontally outwardly. Cradle pieces 32 and 34 are integrally molded of a suitable open or closed-cell foam material and preferably expanded polypropylene to provide an impact absorbing cradle which, as seen in the figures, defines sidewalls 37, a floor 38, top 41, and back wall 39 which closely surrounds the sides 22 and 24 as well as the top 25, bottom 27, and rear wall 29 of airbag module 20. The facing surfaces 31, 33 of cradle pieces 32 and 34 are configured with projections 43 and mating recesses 44 to interlock with one another. Depending upon the specific design of the vehicle and its instrument trim panel 10, the configuration of the outer contours of the cradle 30 will vary in order to conform to and interlock with the instrument panel 10.

In a preferred embodiment, cradle 30 was made of two pieces joined together at contiguous surfaces 31 and 33 on opposite sides of airbag module 20, although in other embodiments the cradle may be of unitary construction. In all embodiments, the cradle will surround the top, bottom, and sides and preferably the rear of the airbag module 20 in order to effectively hold the airbag module in position and allow the snap-fitting of the cradle 30, by the interlocking brackets, into the instrument trim panel 10 without the need for threaded fasteners or the like. The system of the present invention contemplates either the mounting of the airbag module 20 to the cradle 30 during the manufacture of the airbag module 20, such that the airbag module and cradle can be sold as a unit, or subsequently separately assembled during the manufacture of the vehicle.

The cradle sections 32 and 34 define a central, generally rectangular opening 45 (FIG. 2) which will vary in shape depending upon a particular airbag module employed. Thus, the central opening 45 formed in the cradle can also vary depending upon the shape and configuration of an airbag module 20. The airbag module may also be adhesively secured to the contacting surfaces of cradle sections 32 and 34 to adhere the contacting surfaces of the airbag module to the surrounding cradle. In some embodiments of the invention, it may be possible to mold the cradle directly to the airbag module. Although panel 10 is an instrument trim panel, similar panels are employed in vehicle doors and, thus, panel 10 could be a vehicle door panel which receives cradle 30 and airbag module 20 for side impact airbag installations.

It will become apparent to those skilled in the art that these and various other modifications to the preferred embodiment of the invention as described herein can be made without departing from the spirit or scope of the invention as defined by the appended claims.

The invention claimed is:

1. An airbag module mounting system comprising:
   a foam polymeric cradle defined by an upper section and a lower section, said upper and lower sections including mating projections and recesses extending vertically for holding said upper and lower sections in alignment with each other, said upper and lower sections defining a generally horizontally extending central opening for receiving an airbag module; and
   said upper and lower sections including side walls with integrally formed interlocking members extending laterally from said side walls for holding said cradle in a vehicle panel.

2. The system as defined in claim 1, wherein each section of said cradle is integrally molded of a rigid polymeric foam material.

3. The system as defined in claim 2 wherein said foam material comprises an expanded polypropylene.

4. An airbag module mounting system comprising:
   a vehicle panel including a socket for receiving an airbag cradle;
   a foam polymeric cradle defined by an upper section and a lower section, said upper and lower sections including mating projections and recesses extending vertically for holding said upper and lower sections in alignment with each other, said upper and lower sections defining a generally horizontally extending central opening for receiving an airbag module; and
   said upper and lower sections including side walls with integrally formed interlocking members extending laterally from said side walls for mounting said cradle in said socket of said vehicle panel.

5. The system as defined in claim 4 wherein each section of said cradle is integrally molded of a rigid polymeric foam material.

6. The system as defined in claim 5 wherein said foam material comprises an expanded polypropylene.

7. The system as defined in claim 4 wherein said panel is an instrument panel.

8. The system as defined in claim 4 wherein said panel is a door panel.

9. An airbag module and mounting system comprising:
   a foam polymeric cradle having a central opening defined by five side walls for receiving an airbag module, said cradle including interlocking members for securing said cradle to a vehicle panel;
   wherein said cradle is defined by an upper section and a lower section, said upper and lower sections including mating projections and recesses extending vertically for holding said upper and lower sections in alignment, said upper and lower sections defining a generally horizontally extending central opening for receiving an airbag module;
   said airbag module positioned within said central opening of said cradle; and an airbag door extending over said central opening and covering said airbag module.

* * * * *